(12) United States Patent
Bashford et al.

(10) Patent No.: US 7,010,711 B2
(45) Date of Patent: Mar. 7, 2006

(54) METHOD AND APPARATUS OF AUTOMATIC POWER MANAGEMENT CONTROL FOR NATIVE COMMAND QUEUING SERIAL ATA DEVICE

(75) Inventors: Patrick R. Bashford, Fort Collins, CO (US); Brian A. Day, Colorado Springs, CO (US); Vetrivel Ayyavu, Norcross, GA (US); Ganesan Viswanathan, Duluth, GA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/901,520

(22) Filed: Jul. 29, 2004

(65) Prior Publication Data

US 2004/0268169 A1    Dec. 30, 2004

Related U.S. Application Data

(63) Continuation-in-part of application No. 10/606,138, filed on Jun. 25, 2003.

(51) Int. Cl.
*G06F 1/32* (2006.01)
*G06F 13/20* (2006.01)
*G06F 13/28* (2006.01)

(52) U.S. Cl. ............... 713/323; 713/300; 713/322; 713/324; 710/22

(58) Field of Classification Search ............ 713/300, 713/320, 322, 323, 324
See application file for complete search history.

(56) References Cited

U.S. PATENT DOCUMENTS

| | | | | |
|---|---|---|---|---|
| 5,564,015 A | * | 10/1996 | Bunnell | 713/340 |
| 5,799,199 A | * | 8/1998 | Ito et al. | 713/324 |
| 5,974,558 A | * | 10/1999 | Cortopassi et al. | 713/323 |
| 6,608,729 B1 | * | 8/2003 | Willems et al. | 360/69 |
| 6,725,385 B1 | * | 4/2004 | Chu et al. | 713/320 |
| 2004/0148533 A1 | * | 7/2004 | Nicholas | 713/320 |

* cited by examiner

*Primary Examiner*—Lynne H. Browne
*Assistant Examiner*—James K. Trujillo
(74) *Attorney, Agent, or Firm*—Suiter-West-Swantz PC LLO

(57) ABSTRACT

The present invention is directed to a method and apparatus of automatic power management control for Serial ATA interface. In an exemplary aspect of the present invention, an idle or active condition of a Serial ATA interface including a NCQ Serial ATA device is automatically detected. In this step, it is determined, preferably based on a value of the FPDMA (First Party Direct Memory Access) bit in a Task File Ram of the Serial ATA interface, whether the NCQ Serial ATA device is in a FPDMA Data Phase. When the NCQ Serial ATA device is in a FPDMA Data Phase, the Serial ATA interface is active (i.e., not idle). When Serial ATA is in an idle condition, idle time of Serial ATA interface is measured using a power down counter whose frequency is determined by a programmable register based on an input clock. When a power down counter value is equal to a first value, a request for a Partial power state is asserted, and Serial ATA interface is put into a Partial power state. When a power down counter value is equal to a second value, a request for a Slumber power state is asserted, and Serial ATA interface is put into a Slumber power state.

2 Claims, 5 Drawing Sheets

METHOD AND APPARATUS OF AUTOMATIC POWER MANAGEMENT CONTROL FOR NATIVE COMMAND QUEUING SERIAL ATA DEVICE

CROSS-REFERENCE TO RELATED DOCUMENTS

The present application is a continuation-in-part of U.S. application Ser. No. 10/606,138, entitled *Method And Apparatus Of Automatic Power Management Control For Serial ATA Interface*, filed Jun. 25, 2003, which is herein incorporated by reference in its entirety.

The present application herein incorporates U.S. Patent Application with application Ser. No. 10/901,518 and U.S. Patent Application with application Ser. No. 10/901,519, both filed on Jul. 29, 2004, by reference in their entirety.

FIELD OF THE INVENTION

This invention relates generally to power management control, and particularly to a method and apparatus of automatic power management control for a Serial ATA device that supports Native Command Queuing.

BACKGROUND OF THE INVENTION

Serial ATA (Advanced Technology Attachment) is an evolutionary replacement for the Parallel ATA physical storage interface. Serial ATA (SATA) is a computer bus primarily designed for transfer of data between a computer processor and hard disk and has at least three advantages over Parallel ATA, namely speed, cable management, and Serial ATA's ability of being hot swappable. A Native Command Queuing (NCQ) Serial ATA device is a Serial ATA device that supports NCQ. NCQ is a queuing protocol designed to make efficient use of the Serial ATA protocol and streamline the data transfer portion of queued commands. NCQ enables a Serial ATA device to accept multiple commands from a Serial ATA host controller and rearrange the completion order of these commands to maximize throughput.

There are three interface power states supported in Serial ATA: PhyReady, Partial and Slumber. In PhyReady (or power up) state, the PHY (physical) logic and main PLL (phase-locked loop) are both on and active, and the interface is synchronized and capable of receiving and sending data. Partial and Slumber are two power saving (or power down) modes. In both Partial and Slumber states, the PHY logic is powered, but is in a reduced power state. However, while the exit latency from Partial state is generally no longer than 10 μs (microseconds), the exit latency from Slumber state is generally no longer than 10 ms (milliseconds).

When a Serial ATA interface including a NCQ Serial ATA device is idle (i.e., when either a Serial ATA host controller or an attached NCQ Serial ATA device is not active) for a period of time, it is desirable to put the interface into a power saving mode. In addition to saving power while in a power saving mode, the interface lifetime may be increased.

Thus, it would be desirable to provide a method and apparatus of automatic power management control which automatically puts a NCQ Serial ATA device into power up and power down modes.

SUMMARY OF THE INVENTION

In an exemplary aspect of the present invention, a method of automatic power management control for a NCQ Serial ATA device includes steps as follows. An idle or active condition of a Serial ATA interface including a NCQ Serial ATA device is automatically detected. In this step, it is determined, preferably based on a value of the FPDMA (First Party Direct Memory Access) bit in a Task File Ram of the Serial ATA interface, whether the NCQ Serial ATA device is in a FPDMA Data Phase. When the NCQ Serial ATA device is in a FPDMA Data Phase, the Serial ATA interface is active (i.e., not idle). When Serial ATA is in an idle condition, idle time of Serial ATA interface is measured using a power down counter whose frequency is determined by a programmable register based on an input clock. When a power down counter value is equal to a first value, a request for a Partial power state is asserted, and Serial ATA interface is put into a Partial power state. When a power down counter value is equal to a second value, a request for a Slumber power state is asserted, and Serial ATA interface is put into a Slumber power state.

The present invention may put a Serial ATA interface including a NCQ Serial ATA device into power up and power down states automatically. Because the present invention automatically detects the interface idle condition and puts the interface into a power saving mode when the interface is in idle condition for a programmable period of time, the present invention may save power and increase the interface lifetime. Moreover, because the present invention controls the power state change of the Serial ATA interface by hardware, communications with high level layers of the interface is avoided, which may lead to an efficient power saving method.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
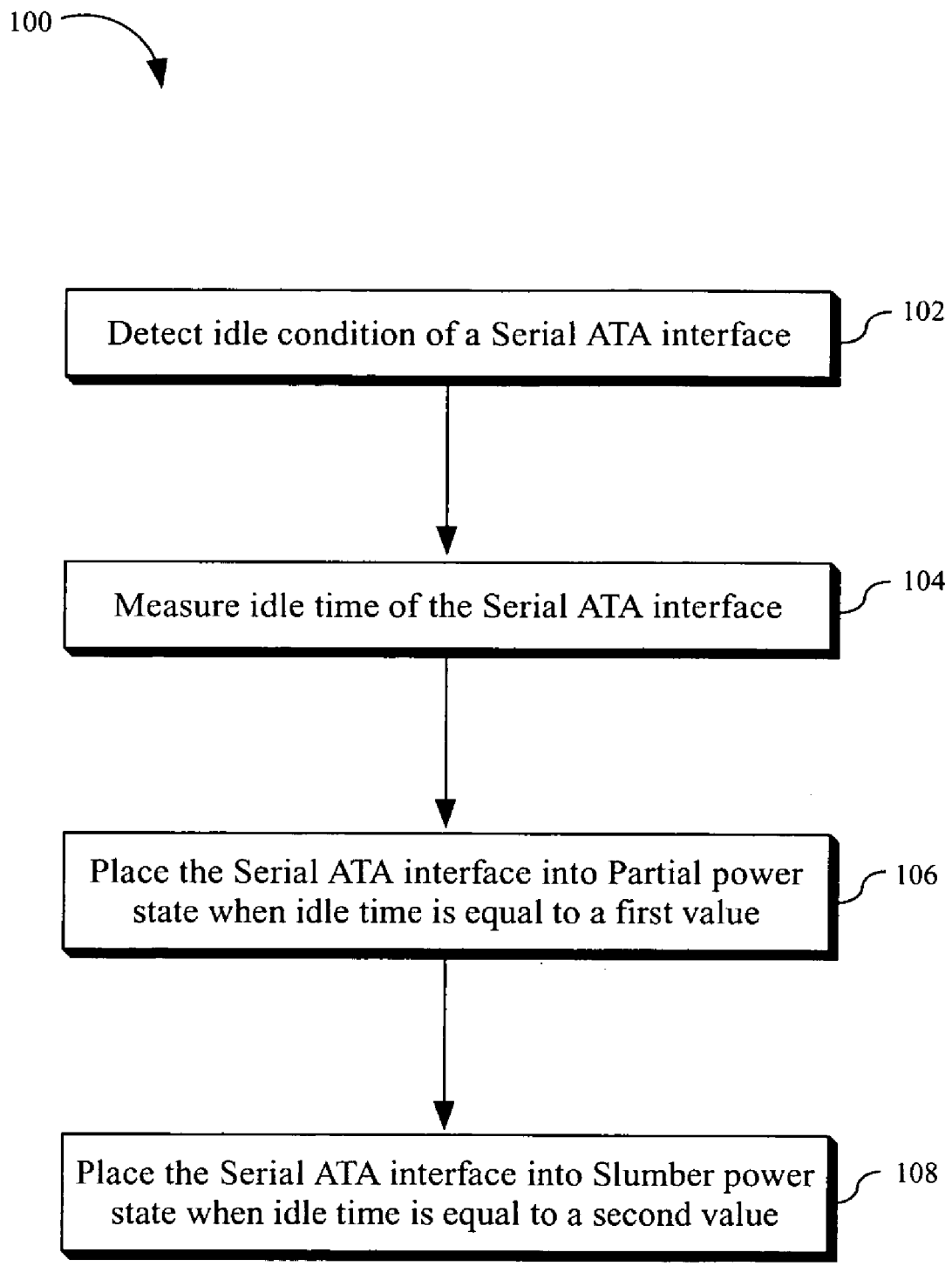
FIG. 1 is a flow diagram showing a method of automatic power management control for a NCQ Serial ATA device in accordance with an exemplary embodiment of the present invention.

Referring first to FIG. 1, a method (or process) 100 of automatic power management control for a NCQ Serial ATA device in accordance with an exemplary embodiment of the present invention is shown. The process 100 starts with step 102, in which an idle condition of a Serial ATA interface including a NCQ Serial ATA device is detected. In the Serial ATA protocol prior to NCQ, a determination of whether or not a Serial ATA device is idle may be made by tracking the state of the BSY and DRQ bits for that device. However, to support automated power management for a Serial ATA device that supports NCQ, additional information is required to track the NCQ protocol and identify points in the NCQ protocol where the device may and may not be powered down. With the advent of NCQ, it may be preferable not to power down the device during a FPDMA (First Party Direct Memory Access) Data Phase. However, during the FPDMA Data Phase of a NCQ command, the state of the BSY and DRQ bits is not sufficient to indicate that the device is not idle. Thus, in step 102 it is determined whether the NCQ Serial ATA device is in a FPDMA Data Phase. Preferably, this is performed based on a value of the FPDMA (First Party Direct Memory Access) bit in the Task File Ram (also referred to as "Task File Register") of the Serial ATA interface. When the the NCQ Serial ATA device is in a FPDMA Data Phase, the Serial ATA device is active (i.e., not idle). Preferably, when the FPDMA bit (also referred to as "FPDMA active bit") has a value of "1" (one), the NCQ Serial ATA device is in a FPDMA Data Phase.

Figure 2:
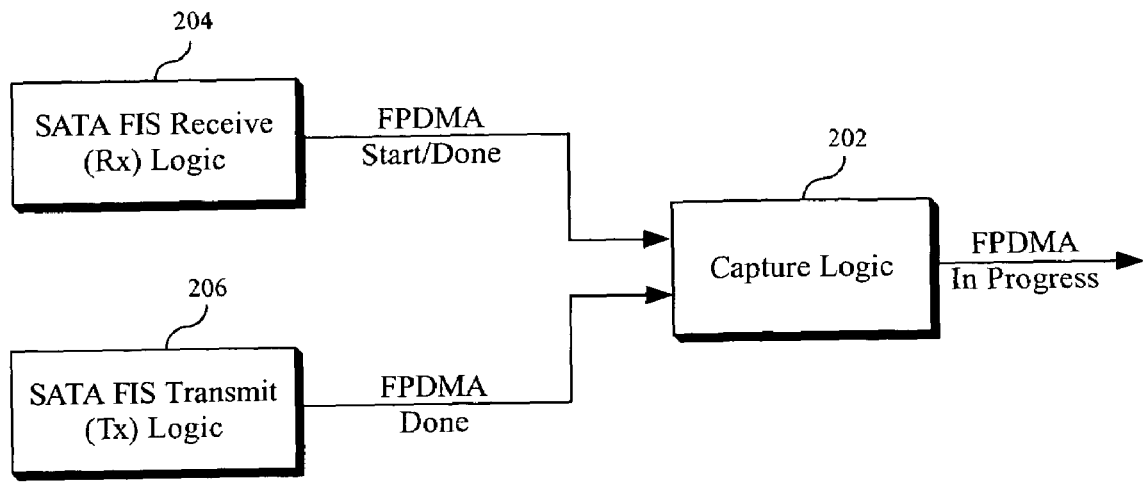
FIG. 2 is a schematic block diagram of the logic for determining if a NCQ Serial ATA device is in a FPDMA Data Phase in accordance with an exemplary embodiment of the present invention.

FIG. 2 is a schematic block diagram of the logic for determining if a NCQ Serial ATA device is in a FPDMA Data Phase in accordance with an exemplary embodiment of the present invention. As shown, capture logic 202 captures the information being written to the Task File Ram of the NCQ Serial ATA interface. A variety of information for each Serial ATA device is stored in the Task File Ram as part of the overall support for Serial ATA in the host controller. By monitoring the signals that write information to the Task File Ram, this circuit 202 may observe when the FPDMA bit in the Task File Ram is written and extract the value that is being written to the FPDMA bit. Logic 204 receives Serial ATA FISes (Frame Information Structures) and analyzes them per the SATA protocol. When the received FIS is a DMA Setup FIS, the logic 204 may initiate a "write" to the Task File Ram that preferably writes, among other information, the FPDMA bit to "1" (one) to signal the start of a FPDMA data phase. Additionally, when the data transfer direction is into the host controller, the logic 204 may track the incoming data FISes and signal the end of the FPDMA Data Phase once the data received satisfies the byte count indicated by the DMA Setup FIS. When this count is reached, the logic 204 may preferably write the FPDMA bit to "0" (zero). Logic 206 transmits SATA FISes. When the data transfer direction is out of the host controller, the logic 206 may track the outgoing data FISes and signal the end of the FPDMA Data Phase once the data sent satisfies the byte count indicated by the DMA Setup FIS. When this count is reached, the logic 206 may write the FPDMA bit to "0" (zero) to indicate the end of the FPDMA Data Phase.

Figure 3:
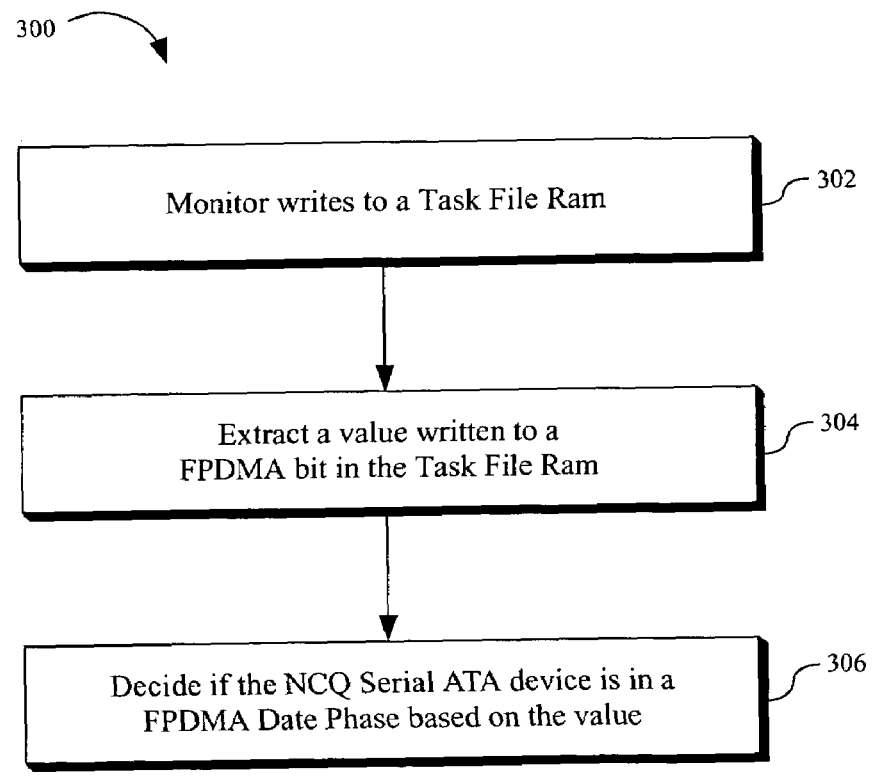
FIG. 3 is a flow diagram depicting a method for determining if a NCQ Serial ATA device is in a FPDMA Data Phase in accordance with an exemplary embodiment of the present invention.

FIG. 3 is a flow diagram depicting a method 300 for determining if a NCQ Serial ATA device is in a FPDMA Data Phase in accordance with an exemplary embodiment of the present invention. The method 300 may be implemented in the logic shown in FIG. 2. The method 300 starts with step 302 in which writes to the Task File Ram of a Serial ATA interface including the NCQ Serial ATA device are monitored. A value written to a FPDMA bit in the Task File Ram is extracted 304. Based on the value written to the FPDMA bit, it is determined if the NCQ Serial ATA device is in a FPDMA Data Phase 306.

Those of ordinary skill in the art will understand that circuits and methods for determining if a NCQ Serial ATA device is in a FPDMA Data Phase other than those shown in FIGS. 2 and 3 may be applied without departing from the scope and spirit of the present invention.

Referring back to FIG. 1, idle time of the Serial ATA interface is measured 104. The Serial ATA interface is placed into Partial power state when the measured idle time is equal to a first value 106. The Serial ATA interface is placed into Slumber power state when the measured idle time is equal to a second value 108. In a preferred embodiment of the present invention, the second value is always greater than the first value. That way, when both power saving modes are supported and enabled, the present invention ensures that the Serial ATA interface is first placed into Partial State, followed by Slumber. It is understood that other embodiments may be contemplated by a person of ordinary skill in the art without departing from the scope and spirit of the present invention. For example, in an alternative embodiment of the steps 106 and 108, the Serial ATA interface may be placed into a power saving mode when the measured idle time is equal to a predetermined value, wherein the power saving mode is either a Partial power state or a Slumber power state.

Figure 4:
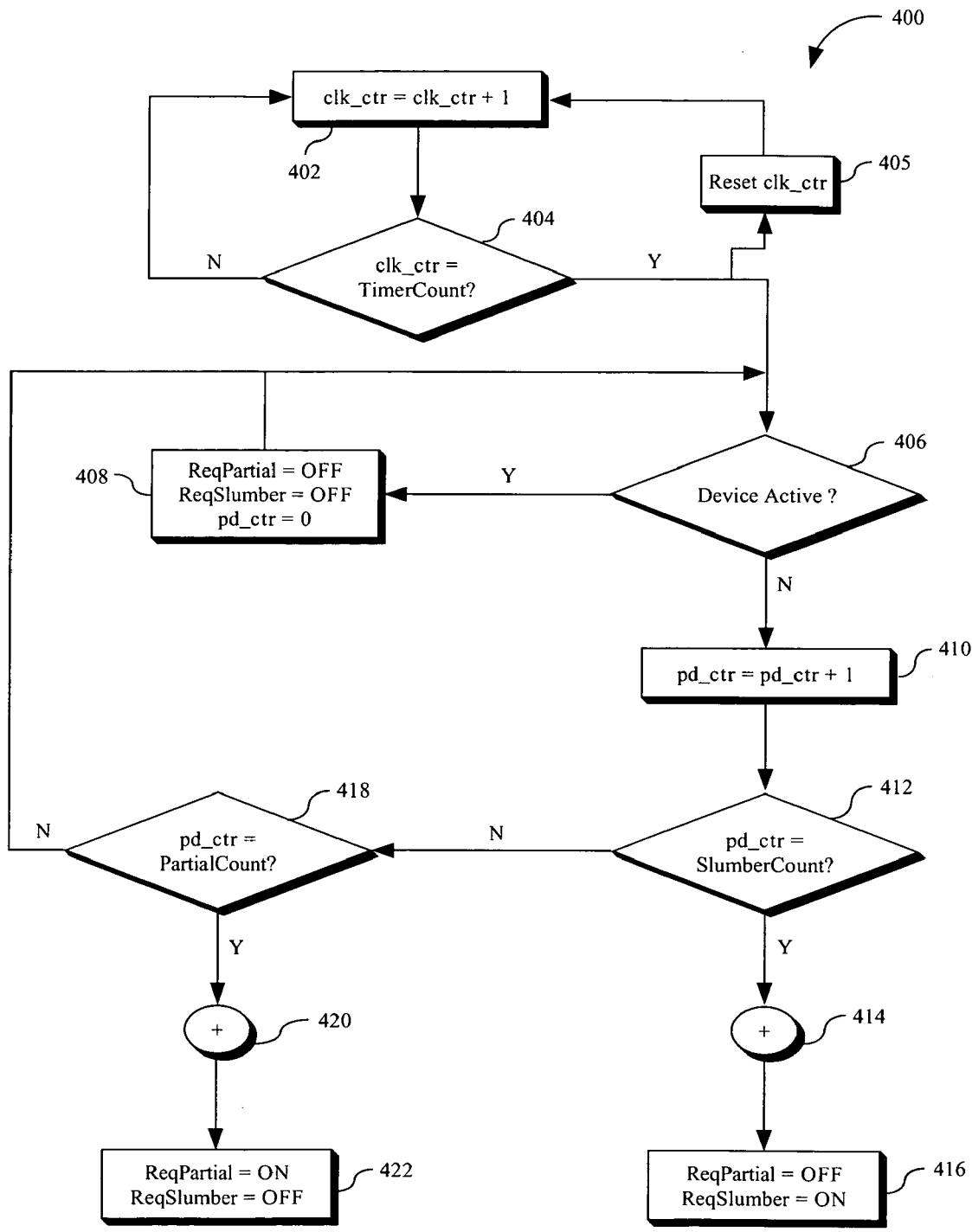
FIG. 4 is a flow diagram depicting a method of automatic power management control for a NCQ Serial ATA device in accordance with a further exemplary embodiment of the present invention.

Referring now to FIG. 4, a method (or process) 400 of automatic power management control for a Serial ATA interface including a NCQ Serial ATA device in accordance with a further exemplary embodiment of the present invention is shown. According to the present invention, there may be three programmable registers: Timer Count Reg, Partial Count Reg, and Slumber Count Reg. Timer Count Reg holds a programmable value TimerCount, which determines the frequency for a power down counter (pd_ctr). For example, based on the frequency of the input clock, Timer Count Reg may be programmed accordingly to obtain the time period such as 1 ms, 2 ms, or the like for the pd_ctr. Partial Count Reg holds a programmable non-zero value PartialCount. When a pd_ctr value is equal to PartialCount, a request for Partial state (ReqPartial) is asserted. Slumber Count Reg holds a programmable non-zero value SlumberCount. When a pd_ctr value is equal to SlumberCount, a request for Slumber state (ReqSlumber) is asserted.

According to the process 400, an input clock counter (clk_ctr) counts the clock (step 402) and checks against TimerCount (step 404) to generate the required frequency to operate the pd_ctr. In the step 404, when the clk_ctr value is equal to TimerCount, the process 400 proceeds to steps 405 and 406 simultaneously. In the step 405, the counter clk_ctr is reset, and the process 400 then returns to the step 402.

In the step 406, the interface idle/active condition is automatically detected. According to one aspect of the present invention, the interface is active if any of the following conditions is true: (1) BSY, DRQ, ERR, or FPDMA bit of ATA task file register is ON; (2) COMWAKE or COMRESET OOB (out of band) signal is detected; and (3) firmware is forcing the interface wakeup from a power saving mode by writing a Firmware Forcing WakeUp bit in automatic power management circuitry. If none of the foregoing conditions is true, then the interface is not active (i.e., idle).

When the interface is detected to be active, the process 400 proceeds to step 408, in which any power down requests (ReqPartial and/or ReqSlumber) are de-asserted and the pd_ctr is reset. After the step 408, the process 400 returns to the step 406.

When the interface is detected to be inactive, the process 400 proceeds to step 410, in which the pd_ctr starts to count the interface idle time. Next, in step 412, the pd_ctr value is checked against SlumberCount. If the pd_ctr value is equal to SlumberCount, then in step 414, Slumber Request may be received. Next, in step 416, ReqSlumber is ON (asserted), and ReqPartial is OFF (not asserted). Thus, the interface may be placed into Slumber state.

Following the step 412, if the pd_ctr value is not equal to SlumberCount, then in step 418, the pd_ctr value is checked against PartialCount. If the pd_ctr value is not equal to PartialCount, the process 400 returns to the step 406. If the pd_ctr value is equal to PartialCount, then in step 420, Partial Request may be received. Next, in step 422, ReqPartial is ON (asserted), and ReqSlumber is OFF (not asserted). Thus, the interface may be placed into Partial state.

In a preferred embodiment of the present invention, SlumberCount is always greater than PartialCount. That way, when both power saving modes are supported and enabled, the present invention ensures that ReqPartial is asserted first, followed by a ReqSlumber. It is understood that other embodiments may be contemplated by a person of ordinary skill in the art without departing from the scope and spirit of the present invention.

Figure 5:
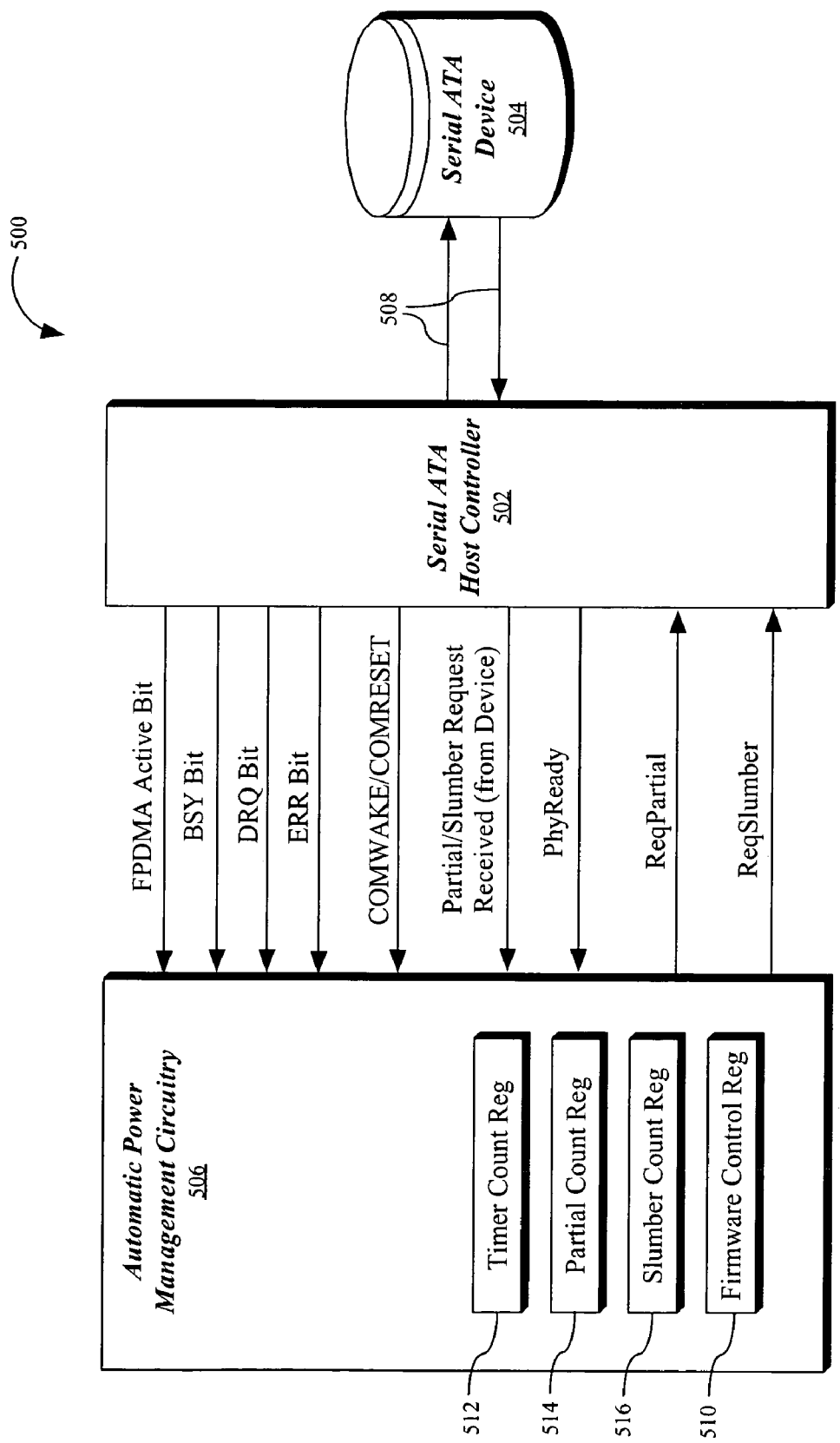
FIG. 5 is a schematic block diagram illustrating an apparatus of automatic power management control for a Serial ATA interface in accordance with an exemplary embodiment of the present invention, including a NCQ serial ATA device, a Serial ATA host controller, and automatic power management circuitry.

FIG. 5 is a schematic block diagram illustrating an apparatus 500 of automatic power management control for a Serial ATA interface including a NCQ Serial ATA device in accordance with an exemplary embodiment of the present invention. The method 100 shown in FIG. 1, the method 300 shown in FIG. 3, and the method 400 shown in FIG. 4 may be implemented in the apparatus 500. The apparatus 500 includes a Serial ATA host controller 502, a NCQ Serial ATA device 504, and automatic power management circuitry 506. Those of ordinary skill in the art will understand that the Serial ATA host controller 502 and the Serial ATA drive 504 each have its own physical (PHY), link, transport, and application layers (not shown). The Serial ATA host controller 502 and the Serial ATA drive 504 are directly connected through Serial ATA cables 508. Alternatively, the Serial ATA host controller 502 may be a SAS/SATA host controller, to which the NCQ Serial ATA device 504 may be either directly attached or accessed through a SAS Expander via the SCSI Tunneling Protocol (STP), as described in the co-pending patent application with Express Mail Mailing Label No. EV 363 679 976 US. In the case where the SATA device 504 is attached via the expander, the SAS/SATA host controller uses the SAS STP protocol to access the device and no SATA power management is allowed per the SAS specification. On the other hand, in the case where the SATA device is directly attached to the SAS/SATA host controller, SATA power management is allowed.

In an exemplary embodiment, the automatic power management circuitry 506 may include a Firmware Control Reg 510 and three programmable registers (Timer Count Reg 512, Partial Count Reg 514, Slumber Count Reg 516). In a preferred embodiment, the Firmware Control Reg 510 is a 32-bit register, whose Bit0 is a Firmware Forcing Slumber bit, Bit1 is a Firmware Forcing Partial bit, and Bit2 is a Firmware Forcing WakeUp bit. The automatic power management circuitry 506 detects the active/idle condition of the Serial ATA host controller 502 through BSY, DRQ, ERR, and FPDMA Bits and may issue power down requests (ReqPartial and ReqSlumber) to the physical layer of the Serial ATA host controller 502. The automatic power management circuitry 506 may also issue ReqPartial and/or ReqSlumber to the physical layer of the Serial ATA host controller 502 when it receives power down requests from the Serial ATA device 504.

It is understood that FIG. 5 is intended as an example of an apparatus for automatic power management control of the Serial ATA interface in accordance with the present invention and not as an architectural limitation to the present invention. Those of ordinary skill in the art will appreciate that various combinations and arrangements may be employed without departing from the scope and spirit of the present invention. For example, the Serial ATA host controller 502 in FIG. 5 may be connected to more than one Serial ATA devices. In one embodiment, a Serial ATA host controller may have two ports Port 1 and Port 2, which are connected to Serial ATA devices Drive 1 and Drive 2, respectively. In this case, according to the present invention, for each port there may be independent, identical automatic power management circuitry. If Port 1 of the host controller and Drive 1 are in idle state, then only Port 1 and Drive 1 may be put into a power saving state, but not Port 2 and Drive 2 (assuming Port 2 and Drive 2 are in active state). In addition, the Timer Count Reg 512, the Partial Count Reg 514, the Slumber Count Reg 516, and the Firmware Control Reg 510 may be physically located outside the automatic power management circuitry 506.

Figure 6:
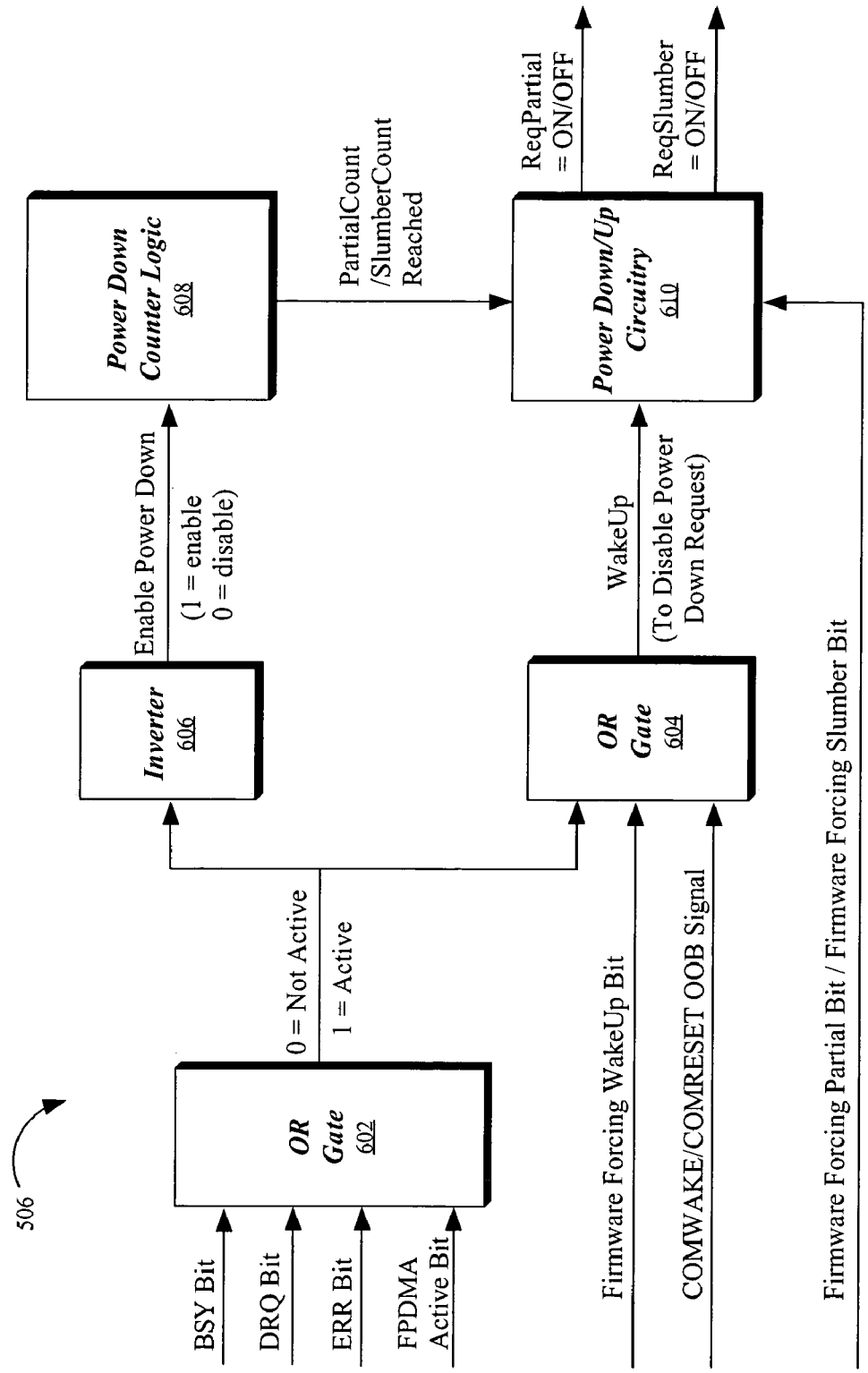
FIG. 6 is a schematic block diagram illustrating an exemplary embodiment of the automatic power management circuitry shown in FIG. 5 in accordance with an exemplary embodiment of the present invention, wherein the Timer Count Reg, the Partial Count Reg, the Slumber Count Reg, and the Firmware Control Reg are not shown.

FIG. 6 is a schematic block diagram illustrating an exemplary embodiment of the automatic power management circuitry 506 shown in FIG. 5 in accordance with an exemplary embodiment of the present invention, wherein the Timer Count Reg, the Partial Count Reg, the Slumber Count Reg, and the Firmware Control Reg are not shown. The method 100 shown in FIG. 1 and the method 400 shown in FIG. 4 may be implemented in the automatic power management circuitry 506. The circuitry 506 may include a first OR gate 602, a second OR gate 604, an inverter 606, power down counter logic 608 (for counting idle time of a Serial ATA host controller and comparing a power down counter value against PartialCount/SlumberCount), and power down/up circuitry 610 (for issuing a power down or power up request to the Serial ATA host controller physical layer).

The OR gate 602 receives BSY Bit, DRQ Bit, ERR Bit, and FPDMA Bit as input and outputs a value ("1" or "0", where, preferably, "1" indicates a Serial ATA host controller is active, and "0" indicates a Serial ATA host controller is not active) to both the inverter 606 and the OR gate 604 as input. When the OR gate 602 outputs "0", a Serial ATA host controller is not active, and the inverter 606 outputs "1" which enables the power down counter logic 608. When the power down counter value reaches PartialCount or SlumberCount, the power down/up circuitry 610 issues a power down request to the Serial ATA Physical Layer. Consequently, a power down state of the Serial ATA host controller may result.

The OR gate 604 receives as input an output from the OR gate 602, a Firmware Forcing WakeUp Bit, and a COM-WAKE or COMREST OOB signal and may output a WakeUp signal to the power down/up circuitry 610, which in turn issues a power up request to the Serial ATA Physical Layer. Consequently, a power up state of the Serial ATA host controller may result.

In addition, a Firmware Forcing Partial Bit or a Firmware Forcing Slumber Bit may be directly written into the power down/up circuitry 610, which then issues a power down request to the Serial ATA Physical Layer, resulting in a power down state of the Serial ATA host controller.

The present invention may place a Serial ATA interface including a NCQ Serial ATA device into power up and power down states automatically by its own. The apparatus of the present invention may automatically detect the interface idle condition and put the interface into a power saving mode when the interface is in idle condition for a programmable period of time. Thus, the present invention may save power and increase the interface lifetime. Moreover, because the present invention controls the power state change of the Serial ATA interface by hardware, communications with high level layers of the interface is avoided, which may lead to an efficient power saving method.

It is appreciated that the present invention is not limited to a Serial ATA interface. The present invention may also apply to a variety of other interfaces as may be contemplated by a person of ordinary skill in the art.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of automatic power management control for a Serial Advanced Technology Attachment (ATA) interface including a Native Command Queuing Serial ATA device and a host controller, comprising steps of:
    detecting an idle condition of said Serial ATA interface, said detecting step comprises a step of determining whether said Native Command Queuing Serial ATA device is in a First Party Direct Memory Access (FP-DMA) Data Phase;
    measuring idle time of said Serial ATA interface when said Serial ATA is idle; and
    placing said Serial ATA interface into a first power saving mode when said idle time is equal to a first value,
    wherein said measuring step is performed by a power down counter whose frequency is determined by a programmable register based on an input clock.

2. An apparatus of automatic power management control for a Serial Advanced Technology Attachment (ATA) interface including a Native Command Queuing Serial ATA device and a host controller, comprising:
    means for detecting an idle condition of said Serial ATA interface, including means for determining whether said Native Command Queuing Serial ATA device is in a First Party Direct Memory Access (FPDMA) Data Phase;
    means for measuring idle time of said Serial ATA interface when said Serial ATA is idle; and
    means for placing said Serial ATA interface into a first power saving mode when said idle time is equal to a first value,
    wherein said means for measuring includes a power down counter whose frequency is determined by a programmable register based on an input clock.

* * * * *